United States Patent
Kothari et al.

(10) Patent No.: US 10,958,621 B2
(45) Date of Patent: *Mar. 23, 2021

(54) SYSTEMS AND METHODS FOR MAINTAINING AN ASYNCHRONOUS COMMUNICATION VIA AN INTERMEDIARY

(71) Applicant: Google LLC, Mountain View, CA (US)

(72) Inventors: Anshul Kothari, Mountain View, CA (US); Gaurav Bhaya, Mountain View, CA (US); Amit Agarwal, Mountain View, CA (US); Surojit Chatterjee, Los Altos, CA (US); Vibhor Nanavati, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/989,737

(22) Filed: Aug. 10, 2020

(65) Prior Publication Data
US 2020/0374265 A1 Nov. 26, 2020

Related U.S. Application Data

(63) Continuation of application No. 16/058,571, filed on Aug. 8, 2018, now Pat. No. 10,742,598, which is a
(Continued)

(51) Int. Cl.
*G06F 15/16* (2006.01)
*H04L 29/12* (2006.01)
(Continued)

(52) U.S. Cl.
CPC ...... *H04L 61/2596* (2013.01); *H04L 63/0281* (2013.01); *H04L 67/141* (2013.01); *H04L 67/28* (2013.01); *H04L 63/0421* (2013.01)

(58) Field of Classification Search
CPC ............. H04L 67/2804; H04L 4167/42; H04L 61/2596; H04L 63/0421; H04L 67/141; H04L 67/28
(Continued)

(56) References Cited

U.S. PATENT DOCUMENTS 5,974,453 A * 10/1999 Andersen ................ H04L 61/10
709/220
6,721,288 B1 * 4/2004 King ........................ H04L 29/06
370/310
(Continued)

OTHER PUBLICATIONS

"How Thumbtack Works", Thumbtack, 2014, retrieved from URL: https://www.thumbtack.com/how-it-works (3 pages).
(Continued)

*Primary Examiner* — Imad Hussain
(74) *Attorney, Agent, or Firm* — Foley and Lardner LLP

(57) ABSTRACT

The disclosure is directed to maintaining an asynchronous communication via an intermediary. An agent executed on a device intermediary to clients and providers can receive a request from a client for an asynchronous communication between the client device and a provider device. The agent identifies a provider dynamic identifier identifying the provider. The agent uses a communication channel selection policy to determine a communication channel and a provider static identifier corresponding to the provider device. The agent maps a client dynamic identifier assigned by the server to a client static identifier of the client device. The agent generates a transmission data package including the content, a source address identifying the client dynamic identifier and a destination address identifying the provider static identifier. The agent provides the generated transmission data package for transmission via the communication channel determined using the communication channel selection policy to the provider device.

20 Claims, 4 Drawing Sheets

Related U.S. Application Data continuation of application No. 14/936,315, filed on Nov. 9, 2015, now Pat. No. 10,051,075.

(60) Provisional application No. 62/216,144, filed on Sep. 9, 2015.

(51) Int. Cl.
*H04L 29/08* (2006.01)
*H04L 29/06* (2006.01)

(58) Field of Classification Search
USPC .......................................................... 709/203
See application file for complete search history.

(56) References Cited

U.S. PATENT DOCUMENTS

| | | | | |
|---|---|---|---|---|
| 6,823,386 | B1* | 11/2004 | Crump | H04L 29/12018 709/224 |
| 7,096,193 | B1 | 8/2006 | Beaudoin et al. | |
| 7,136,387 | B2* | 11/2006 | Gallant | H04L 12/6418 370/395.52 |
| 7,139,728 | B2 | 11/2006 | Rigole | |
| 7,363,271 | B2 | 4/2008 | Morimoto | |
| 7,567,560 | B1* | 7/2009 | Balasubramaniyan | H04L 47/10 370/389 |
| 8,078,153 | B2* | 12/2011 | Pattison | H04L 67/327 455/414.4 |
| 8,750,183 | B2 | 6/2014 | Smith et al. | |
| 9,693,217 | B2* | 6/2017 | Kasslin | H04L 67/16 |
| 10,051,075 | B1* | 8/2018 | Kothari | H04L 61/2596 |
| 10,742,598 | B1* | 8/2020 | Kothari | H04L 61/2596 |
| 2001/0049745 | A1* | 12/2001 | Schoeffler | H04L 51/30 709/238 |
| 2003/0088788 | A1* | 5/2003 | Yang | H04L 63/0254 726/4 |
| 2004/0186755 | A1 | 9/2004 | Roche | |
| 2005/0050228 | A1* | 3/2005 | Perham | H04L 67/2823 709/246 |
| 2005/0223021 | A1* | 10/2005 | Batra | G06Q 10/00 |
| 2006/0143699 | A1* | 6/2006 | Nagata | H04L 63/0227 726/11 |
| 2006/0161616 | A1* | 7/2006 | I'Anson | H04L 67/02 709/203 |
| 2008/0177829 | A1* | 7/2008 | Banerjee | H04L 63/08 709/203 |
| 2008/0182548 | A1* | 7/2008 | Pattison | H04L 69/08 455/406 |
| 2008/0246605 | A1 | 10/2008 | Pfeffer et al. | |
| 2009/0132632 | A1 | 5/2009 | Jackson et al. | |
| 2009/0150936 | A1* | 6/2009 | Lee | H04N 21/4821 725/46 |
| 2009/0300217 | A1* | 12/2009 | Patel | H04L 29/12311 709/245 |
| 2010/0262650 | A1* | 10/2010 | Chauhan | H04L 67/26 709/203 |
| 2011/0294464 | A1 | 12/2011 | Fiatal | |
| 2013/0185786 | A1* | 7/2013 | Dyer | H04L 61/2589 726/12 |
| 2016/0353269 | A1* | 12/2016 | Kasslin | H04W 48/16 |
| 2017/0332420 | A1* | 11/2017 | Cui | H04W 76/11 |

OTHER PUBLICATIONS

"How Thumbtack Works", Thumbtack, 2020, retrieved from URL: https://www.thumbtack.com/pros/how-thumbtack-works (3 pages).

Justdial, retrieved from URL: http://us.justdial.com/MA/Boston/Paint-Sprayers/ct-1000648875 (10 pages).

Non-Final Office Action for U.S. Appl. No. 14/936,315 dated Dec. 13, 2017 (10 pages).

Non-Final Office Action for U.S. Appl. No. 16/058,571 dated Dec. 30, 2019 (6 pages).

Notice of Allowance for U.S. Appl. No. 14/936,315 dated Apr. 12, 2018 (6 pages).

Notice of Allowance for U.S. Appl. No. 16/058,571 dated Apr. 1, 2020 (6 pages).

Notice of Allowance for U.S. Appl. No. 16/058,571 dated May 14, 2020 (6 pages).

* cited by examiner

SYSTEMS AND METHODS FOR MAINTAINING AN ASYNCHRONOUS COMMUNICATION VIA AN INTERMEDIARY

CROSS-REFERENCES TO RELATED APPLICATIONS

This application claims the benefit of priority under 35 U.S.C. § 120 as a continuation of U.S. patent application Ser. No. 16/058,571, filed Aug. 8, 2015, which claims the benefit of priority under 35 U.S.C. § 120 to U.S. patent application Ser. No. 14/936,315, filed Nov. 9, 2015, which claims the benefit of priority under 35 U.S.C. § 119 to U.S. Provisional Patent Application No. 62/216,144, filed on Sep. 9, 2015, each of which are hereby incorporated by reference herein in their entireties.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

The present disclosure is generally directed to systems and methods of establishing and maintaining one or more asynchronous communications via an intermediary. The technology relates to a platform that enables asynchronous (e.g., SMS, email, or instant message) communication between user devices and business/service provider devices that allows users and service providers to exchange electronic communications with each other using different communication channels or modes. The technology allows the user and/or service provider to switch from a first communication channel (e.g., email) to a second communication channel or mode (e.g., SMS) even after the conversation between the user and the service provider has been established on the first communication channel. Moreover, the technology allows for the history of the conversation to be maintained in the second communication channel to which the conversation has switched. The technology further anonymizes both endpoints of the asynchronous communications. For example, the service provider may not have access to a phone number of the user device, and the user device may not have access to a phone number of the service provider's device. Thus, the present disclosure describes a platform that provides for bidirectional, anonymous and asynchronous communications using multiple dynamic identifiers generated by a server serving as an intermediary to the client and the service provider.

At least one aspect is directed to a method of maintaining an asynchronous communication via an intermediary. The method can be performed by a data processing system that includes one or more processors and memory. The data processing can include an asynchronous communication agent executed by the one or more processors. The data processing system can be intermediary to a plurality of client devices and a plurality of provider devices. The method can include the data processing system receiving a request for an asynchronous communication. The data processing system can receive the request from a client device of the plurality of client devices. The request can be for an asynchronous communication between the client device and one or more provider devices of the plurality of provider devices. The request can include a client static identifier identifying the client device. The request can also include, identify, or be associated with content to deliver to the one or more providers. The method can include the asynchronous communication agent identifying a provider of the one or more providers satisfying the request. The method can include the asynchronous communication agent identifying a provider dynamic identifier identifying the provider. The provider dynamic identifier can be generated by the server for the asynchronous communication. The method can include the asynchronous communication agent determining a communication channel over which to deliver content of the request to the provider device. The asynchronous communication agent can use a communication channel selection policy to determine the communication channel and a provider static identifier corresponding to the provider device. The method can include the asynchronous communication agent mapping, in an asynchronous communication data structure, a client dynamic identifier assigned by the server to the client static identifier of the client device. The method can include the asynchronous communication agent generating a transmission data package including the content, a source address identifying the client dynamic identifier and a destination address identifying the provider static identifier. The method can include the asynchronous communication agent providing the generated transmission data package for transmission via the communication channel determined using the communication channel selection policy to the provider device.

The communication channel can include a provider-side communication channel. The asynchronous communication agent can receive the request for the asynchronous communication from the client device via a client-side communication channel different from the provider-side communication channel. The request can be in a first format. The asynchronous communication agent can translate the content from the first format to a second format corresponding to the provider-side communication channel determined using the communication channel selection policy. The asynchronous communication agent can generate the transmission data package including the content in the second format.

The data processing system can receive, prior to the request for the asynchronous communication, a request for a content item for display. The request for the content item can include the client static identifier retrieved from memory of the client device. The data processing system can select, responsive to the request for the content item, a content item of the provider. The data processing system can determine the provider dynamic identifier. The data processing system can provide, via a computer network, the provider dynamic identifier with the selected content item for display on a display device of the client device. In some implementations, the data processing system can retrieve, from a content item data structure, the provider static identifier corresponding to the provider of the content item. The data processing system can determine the provider dynamic identifier based on a second tuple including the client static identifier received via the request for the content item and the provider static identifier. In some implementations, the data processing system can determine, based on the client static identifier, a client-side communication channel over which to deliver the content from the client device to the data processing system. The data processing system can determine the provider dynamic identifier based on the determined client-side communication channel.

In some implementations, where the communication channel includes a provider-side communication channel, the data processing system can receive a second request from the provider device to asynchronously communicate with the client device. The second request can identify the client dynamic identifier and the provider static identifier. The data processing system can determine the client static identifier using a second tuple including the client dynamic identifier and the provider static identifier. The data processing system can generate a second transmission data package including content of the second request. The second source address can identify the provider dynamic identifier and a destination address identifying the client static identifier. The data processing system can provide the generated second transmission data package for transmission via a client-side communication channel between the data processing system and the client device. In some implementations, the data processing system provides the generated second transmission data package for transmission via the client-side communication channel different from the provider-side communication channel.

The data processing system 120 can monitor a provider data structure to maintain the request for the asynchronous communication in an active state. The data processing system can identify, responsive to the monitoring, a second provider added to the provider data structure subsequent to receiving the request from the client device. The data processing system can retrieve the content of the request from the client device responsive to identifying the second provider added to the provider data structure. The data processing system can generate a second transmission data package including the content. The source address can identify the client dynamic identifier and a second destination address identifying a second provider static identifier corresponding to a second provider device of the second provider. The data processing system can provide the generated second transmission data package for transmission via a client-side communication channel between the data processing system and the second provider device. In some implementations, the data processing system can determine a second provider dynamic identifier based on a second tuple including at least two of the client static identifier, the client dynamic identifier, and the provider static identifier. The data processing system can generate, responsive to identifying the second provider, a notification including the second provider dynamic identifier. The data processing system can transmit the notification to the client device.

The data processing system can receive, subsequent to providing the generated transmission data package for transmission via the first provider-side communication channel, an indication from the provider device to switch the communication channel to a second provider-side communication channel different from the first provider-side communication channel. The data processing system can retrieve the content from the previously generated transmission data packet. The data processing system can generate a second transmission data package including the content, the source address identifying the client dynamic identifier and a second destination address identifying a second provider static identifier corresponding to the second provider-side communication channel. The data processing system can provide the generated second transmission data package for transmission via the second provider-side communication channel.

At least one aspect of the present disclosure is directed to a system to maintain an asynchronous communication via an intermediary. The system can include a data processing system having one or more processors and memory. The data processing system can be intermediary to a plurality of client devices and a plurality of provider devices. The data processing system can be configured with or execute an asynchronous communication agent. The data processing system 120 can receive, from a client device of the plurality of client devices, a request for an asynchronous communication between the client device and one or more providers. The request can include a client static identifier identifying the client device and content to deliver to the one or more providers. The data processing system can identify a provider of the one or more providers satisfying the request. The data processing system can identify a provider dynamic identifier identifying the provider. The provider dynamic identifier can be generated by the server for the asynchronous communication. The data processing system can determine, using a communication channel selection policy, a communication channel over which to deliver content of the request to the provider device and a provider static identifier corresponding to the provider device. The data processing system can map, in an asynchronous communication data structure, a client dynamic identifier assigned by the server to the client static identifier of the client device. The data processing system can generate a transmission data package including the content, a source address identifying the client dynamic identifier and a destination address identifying the provider static identifier. The data processing system can provide the generated transmission data package for transmission via the communication channel determined using the communication channel selection policy to the provider device.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
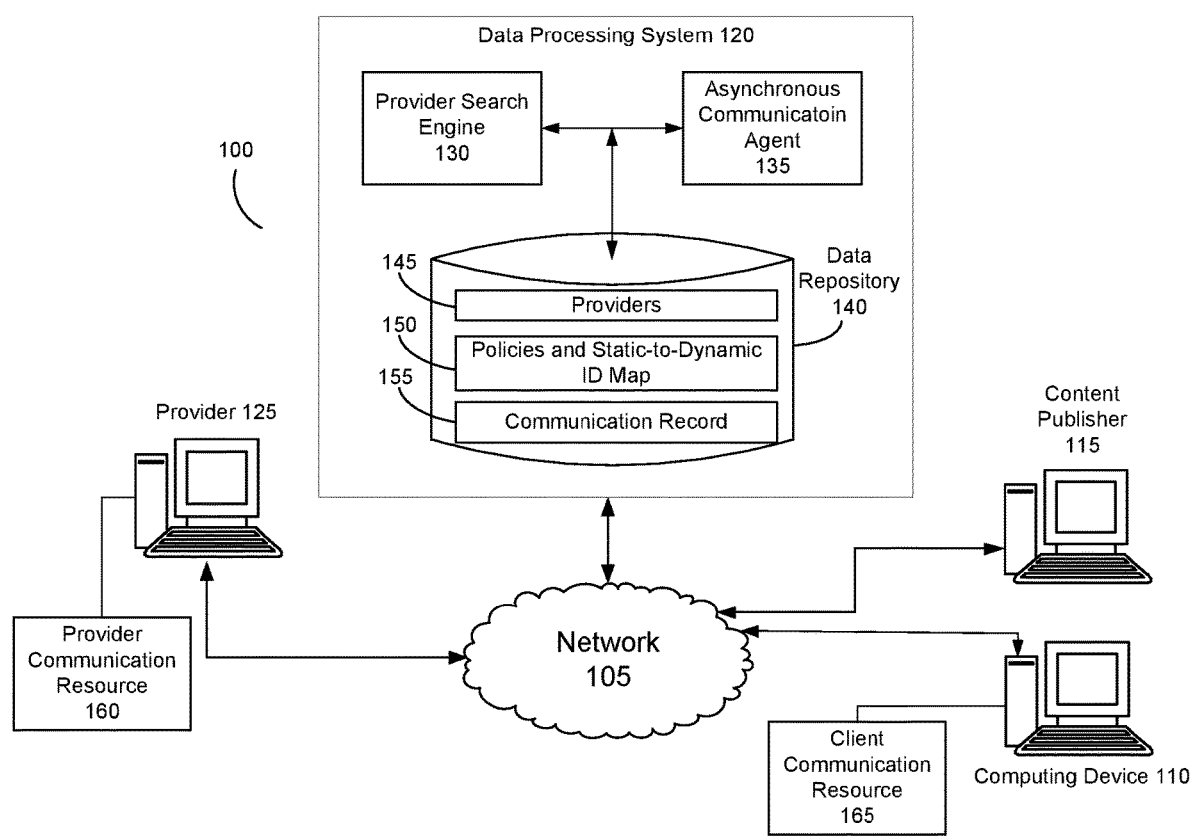
FIG. 1 is an illustration of a system to maintain an asynchronous communication via an intermediary in accordance with an implementation.

The present disclosure is generally directed to systems and methods of establishing and maintaining one or more asynchronous communications via an intermediary. The disclosure relates to a platform that enables asynchronous (e.g., SMS, email, or messaging) communication between client devices and provider devices that allows client devices and provider devices to exchange electronic communications with each other using different communication channels or modes. The technology can allow the client device and/or provider device to switch from a first communication channel (e.g., email) to a second communication channel or mode (e.g., SMS) during an ongoing conversation. In some cases, the technology can maintain the history of the conversation during a communication channel mode switch, and port the history to the new communication channel mode. Further, systems and methods of the present disclosure can assign a dynamic or virtual number to both the client device and provider device to anonymize both endpoints of the asynchronous communications. For example, the service provider may not have access to a static identifier or phone number of the client device, and the client device may not have access to a provider static phone number of the provider device. Thus, the present disclosure describes a platform that provides for bidirectional, anonymous and asynchronous communications using multiple dynamic identifiers generated by a server serving as an intermediary to the client and the service provider.

For example, and in some implementations, a data processing system having one or more servers establishes a first communication channel between a first device and the server. The server then establishes a second communication channel between the server and a second device of a service provider. The server then bridges the first communication channel with the second communication channel. The server receives a first set of communications from the remote entity, formats the first set of communications in a first format to provide it for presentation on the first device via a first application. The server then identifies an indication associated with the first device to switch to a second communication channel. Responsive to the indication, the server formats the first set of communications to a second format for presentation in a second application associated with an account identifier of the first device. The server establishes the second communication channel with the second application and transmits the first set of communications in the second format to for presentation via the second application.

In one implementation, the server can receive a request from a client device for an asynchronous communication between the client device and one or more providers. The request can include a client static identifier identifying the client device. The server can identify a provider dynamic identifier identifying the provider. The server may generate this provider dynamic identifier for the asynchronous communication. The server can determine a communication channel over which to deliver content of the request to the provider device using a communication channel selection policy (e.g., preferences, rules, optimization, load balancing, etc.) including one or more rules for selecting a communication channel over which to deliver the content to the provider device. The server can map a client dynamic identifier assigned by the server to the client static identifier of the client device. The server can generate a transmission data package identifying the client dynamic identifier and including a message from the client and provide the message to the provider via the communication channel determined using the communication channel selection policy to the provider device.

FIG. 1 illustrates an example system 100 to maintain an asynchronous communication via an intermediary. The system 100 can include content selection infrastructure. The system 100 can include a data processing system 120 communicating with one or more of a provider 125, content publisher 115 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115, and at least one provider computing device 125. The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can also include at least one provider search engine 130, at least one asynchronous communication agent 135, and at least one data repository 140. The provider search engine 130 and asynchronous communication agent 135 can each include at least one processing unit or other logic device such as programmable logic array engine, or module configured to communicate with the database repository or database 145. The provider search engine 130, asynchronous communication agent 135 and data repository 140 can be separate components, a single component, or part of the data processing system 120. In some implementations, the provider 125 can include a provider communication resource 160 and the computing device 110 can include a client communication resource 165, such as an application or interface that can receive, transmit and present asynchronous communication data packages. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information, such as geographic location information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The computing device 110 can generate the request via a search engine interface provided by data processing system 120. The computing device 110 can transmit the request via network 105. The request can include a request for one or more providers. A provider can include a provider of goods or services, such as a painter, carpet cleaner, contractor, house cleaning services, car repair, photographer, tutors, mover, interior decorator, physical trainer, nutritionist, etc.

The request can include a query such as a search query input into a provider search engine 130 of the data processing system. The input query may include text, characters, symbols, etc. The data processing system 120 may receive the input query from a computing device 110 via network 105. The input query may include audio (e.g., words spoken by a user of the computing device 110 and input into the provider search engine 130 of the data processing system via network 105 and an interface). The request may include or be associated with information that facilitates selecting content or providers responsive to the request. The information may include or be indicative of, e.g., a type of service, a problem, a project, a goal, a location, budget, price range, timeline, project completion date, scope of project, etc. The data processing system 120 may provide an interface displaying input text boxes, buttons, drop downs, or otherwise widgets through which a user of a client can select or otherwise indicate a category for the search.

Responsive to the provider search query or other request for content (e.g., electronic advertisements), the data processing system 120 (e.g., via provider search engine 130) can identify, select or otherwise obtain content to be provided or presented via the computing device 110 making the request, or some other computing device 110 associated with the request for content. In some implementations, the data processing system 120 may identify, select, or otherwise obtain content independent of or without receiving any request. The content may include, e.g., text, characters, symbols, images, video, audio, or multimedia content. The content may include or be associated with a dynamic identifier and a static identifier of a provider. The content item may include an advertisement in the form of a sponsored link (e.g., provided by content providers 125) included by the provider search engine 130 for display in the search engine results page. The content item may include a link or button to a dynamic identifier that facilitates initiating an asynchronous communication with the provider. In cases where the content item includes a dynamic identifier, the content item may be referred to as a call content item. In some cases, the request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 or available resources of computing device 110 to display or otherwise manipulate the content.

In some implementations, the data processing system 120 can identify multiple content items (e.g., a first candidate content item and a second candidate content item) that are responsive to the request for content or the provider, or are otherwise candidates for display on an online document (e.g., a web page or search results page). The data processing system may initiate or utilize an online auction process to select one or more of the multiple content items for display on the online document. An auction system may determine two or more bids for content items to be displayed in an online document. The auction system can run the bids through an auction process to determine one or more highest ranking bids or auction scores. Content items corresponding to the highest ranking bids or auction scores may be selected for display on or with the online document or search results page.

To identify or select providers responsive to the search query, the provider search engine 130 can analyze, parse, or otherwise process subject matter of candidate content items to determine whether the subject matter of the candidate content items correspond to the query. The provider search engine 130 may identify, analyze, or recognize terms, characters, text, symbols, or images of the candidate content items using an image processing technique, character recognition technique, or database lookup. The candidate content items may include metadata indicative of the subject matter of the candidate content items, in which case the provider search engine 130 may process the metadata to determine whether the subject matter of the candidate content item corresponds to query.

Content providers may provide additional indicators when setting up a content campaign that includes content items. The content provider may provide information at the content campaign or content group level that the provider search engine 130 (or content selector) may identify by performing a lookup using information about the candidate content item. For example, the candidate content item may include a unique identifier, which may map to a content group, content campaign, or content provider. The provider search engine 130 may determine, based on information stored in data repository 140 about the content provider (e.g., a painter), that the candidate content item corresponds to an advertisement for the painter.

The data processing system 120 can include an asynchronous communication agent 135 designed, constructed, configured and executed to initiate, establish, maintain or terminate an asynchronous communication between one or more client devices 110 of a client and one or more provider devices 125 of a provider. The data processing system 120 can receive a request for an asynchronous communication between the client device and one or more providers. The data processing system 120 can identify various types of request including, e.g., a search query for providers, an indication to communicate with selected one or more providers, an active request that periodically queries a data repository 140 for providers, etc. In some cases, the data processing system 120 can display multiple candidate providers 125 (or content items of the providers 125) that satisfy the search query, and receive an indication to initiate a communication with one or more of the providers 125. For example, the data processing system 120 can receive, from the client device 110, a selection of a subset of the plurality of providers 125 that satisfy the search query. The indication can be in the form of selecting a check box, selecting a button, closing or removing the unwanted providers, dragging the provider content item to a portion of the web page displaying the search results, or selecting a link in the content item of the provider, etc.

Figure 3:
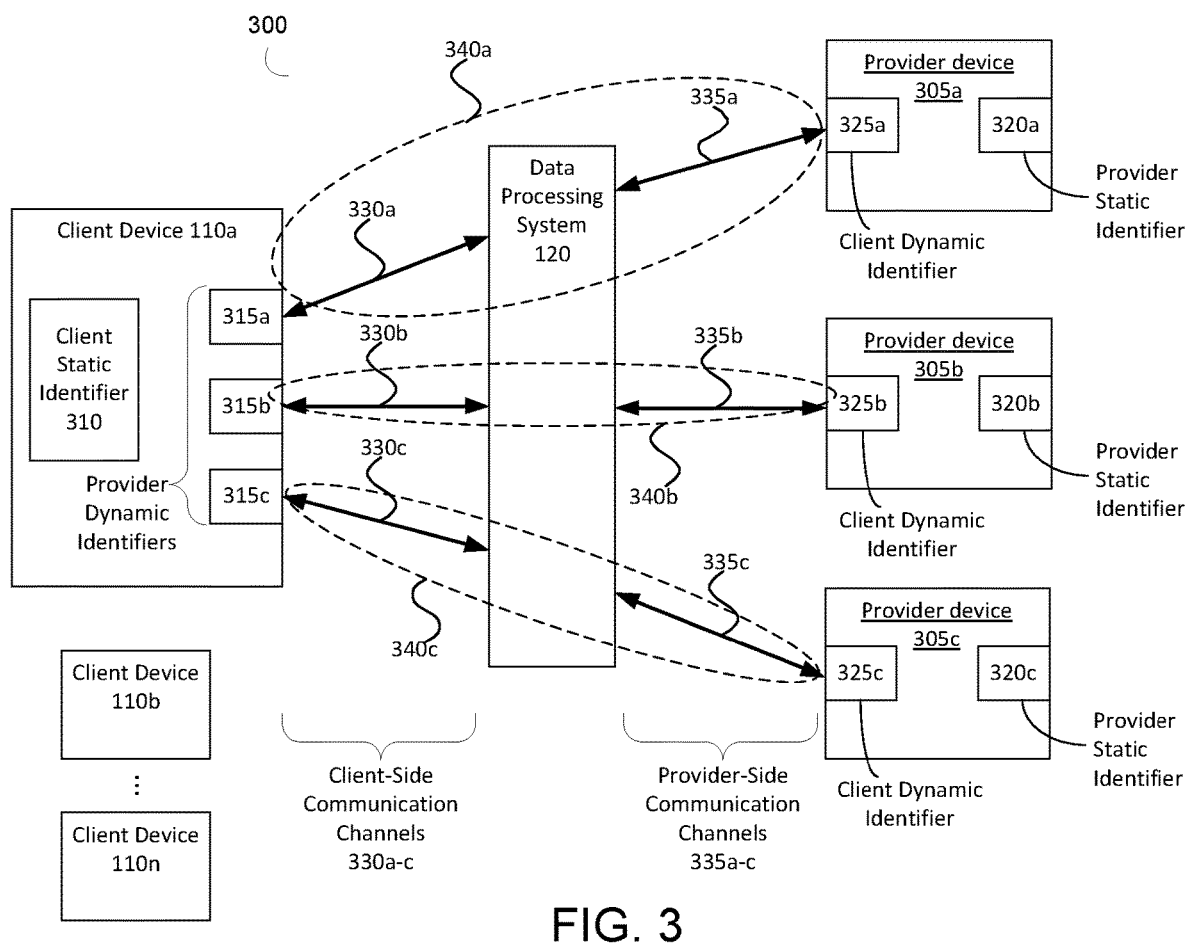
FIG. 3 is a functional block diagram of maintaining an asynchronous communication via an intermediary in accordance with an implementation.

Responsive to receiving the request or indication to initiate, establish, or communicate with a client or provider device, the data processing system 120 can determine a communication channel. The data processing system 120 can be intermediary to a plurality of clients and a plurality of providers. The data processing system 120 can use different communication channels. For example, a single asynchronous communication connection can include a client-side communication channel and a provider-side communication channel, as illustrated in FIG. 3. Thus, the asynchronous communication connection can comprise multiple communication channels. The asynchronous communication connection can refer to a communication path between a single client device and a single provider device established via an intermediary data processing system 120. A communication channel can refer to a mode of communication or a type of communication medium.

The client-side communication channel can be different from the provider-side communication channel. For example, the client-side communication channel can include an e-mail channel, while the provider-side communication channel can include an SMS text messaging channel. The data processing system 120 can determine a communication channel for the leg of the communication using a communication channel selection policy. The data processing system 120 can retrieve the policy from the data repository 140. For example, the policies and Static-to-Dynamic ID map data structure 150 can include communication channel selection policies.

The communication channel selection policy can be used by the data processing system 120 to select a communication channel using various techniques. In some implementations, the communication channel selection policy may include rules or priorities. For example, to select a channel for a client-side communication channel, the policy may indicate to access a profile associated with the client device 110, and identify a preferred communication channel from the profile. An operator of client device 110 may establish or create the profile with a preference for communication channels (e.g., e-mail, text messaging, SMS text message, chat application, text application, or other messaging application). In some implementations, the request to initiate the communication can identify the type of communication channel or mode.

In some implementations, the communication channel selection policy may indicate to the data processing system 120 to determine the communication channel based on available channels with which the data processing system 110 can communicate with the client device. For example, the communication channel selection policy may indicate a channel or mode based on a device type (e.g., cell phone may map to text message; laptop or desktop computer may map to e-mail). In some implementations, the communication channel selection policy may include a priority for the channels. For example, if text messaging is available, then the policy may select a text messaging channel; otherwise, the policy may select e-mail.

In some implementations, the communication channel selection policy may indicate to identify a last used type of communication channel or mode for the client or provider device. In some implementations, the communication channel selection policy may identify a characteristics of the network or location of the computing device. For example, the data processing system 120 may determine that a client device does not have access to a cellular network, and may automatically select or switch the communication mode to e-mail. In some cases, the data processing system 120 can perform the channel selection process on a per message or request basis. In some implementations, the data processing system 120 can receive an indication to select a channel to optimize the communication based on the channel preferred by the destination. For example, a provider device may establish a preference that indicates to use the channel type preferred by the client device.

The request to initiate the communication can include additional information to facilitate initiating, establishing, or maintaining the asynchronous communication channel. For example, the asynchronous communication agent 130 can identify a static identifier identifying the client device 110. A static identifier can refer to an identifier of the client device 110 that may not change for a period of time. A static identifier can refer to a phone number assigned by a telecommunications provider or phone company to the computing device 110, a MAC address of the computing device 110, a device identifier unique to the device, or a username used to log into the computing device or application or operating system executed by the computing device. The static identifier can include numbers, alphanumeric characters, a string, text, phrase, symbol, etc. The static identifier can be difficult or not possible to change. Thus, an operator of the client device 110 may not want to disclose the static identifiers to third parties. Similarly, an operator of a provider device 125 also may not want to disclose a provider static identifier.

To establish the asynchronous communication channel between the client device 110 and a provider device 125, the data processing system 120 can identify, for the provider device, a dynamic identifier identifying the provider device. The dynamic identifier can be different from a static identifier of the provider device. The dynamic identifier can include numbers, alphanumeric characters, a string, text, phrase, symbol, etc. To an end user, the dynamic identifier can appear unrelated or unassociated with any static identifier. The dynamic identifier can correspond to a particular type of communication channel or mode. For example, if the communication channel or mode selected by the client device is electronic mail ("e-mail"), then the dynamic identifier for the client device or provider device may include letters and numbers, an "@" sign, and a domain name. In another example, if the communication channel is SMS text messaging, the dynamic identifier may include numbers only. In yet another example, if the communication channel includes a text messaging or chat application executed by a client device or provider device, the data processing system 120 can determine a format for identifiers used by the chat application, and generate a dynamic identifier that mimics or matches the format.

In some implementations, the data processing system 120 can generate the dynamic identifier. For example, the data processing system 120 can include a data repository 140 having an identifier template data structure. The template data structure can include templates for dynamic identifier formats associated with each type of communication channel. For example, a first chat messaging application may have a format for identifiers that limits the identifier to only ten numbers; a second chat messaging application may have a second format for identifiers that limits the identifier to seven alphanumeric characters, but no symbols; a third chat messaging application may have a third format for identifiers that puts no limits or restrictions on the identifier; a fourth chat messaging application may have a fourth format for identifiers that requires the identifier to be all lowercase, etc. In some cases, the template can be based on preferences established by a provider. For example, a provider may input preferences for dynamic identifiers in the form of a template. The data processing system 120 can store the template provided by the provider in the repository. The template can include preferences for numbers, letters, punctuation, symbols, etc. For example, the provider may indicate a preference for dynamic identifiers to be toll free "800" numbers; or a preference that the dynamic identifier include a provider's name "Paint_Company_ABC" followed by a dynamic identifier. The preferences also may indicate a communication channel or mode, which the data processing system 120 can use to identify the corresponding template for the dynamic identifier.

To generate the dynamic identifier, the asynchronous communication agent 130 can include a dynamic identifier generator that is configured with the template corresponding to the communication channel or mode. In some cases, the data processing system 120 can include or store a pool or repository of dynamic identifiers in data repository 140. For example, the data processing system 120 can be configured with phone numbers (or virtual phone numbers) that the data processing system 120 has already obtained. The data processing system 120 can then assign the virtual phone number to be a dynamic identifier for a provider or client device. In another example, the data processing system 120 can generate dynamic identifiers in an offline process, and validate the dynamic identifier with a corresponding validation server. In this example, a chat messaging application may be provided by a third-party server. Thus, the data processing system 120 can generate dynamic identifiers in the format specified by the chat messaging application, and validate the dynamic identifiers. The data processing system 120 can store the validated dynamic identifiers in a repository, and assign the dynamic identifiers to one or more client or provider devices.

The data processing system 120 can generate, identify, select or assign the dynamic identifier responsive to a request to initiate an asynchronous communication. The data processing system 120 can generate, identify, select or assign the dynamic identifier responsive to the search query. The data processing system 120 can generate, identify, select or assign the dynamic identifier prior to providing the content items on a provider search results page responsive to the search query. The data processing system 120 can generate, identify, select or assign the dynamic identifier responsive to an indication from a provider to generate a dynamic identifier for a provider content item. The data processing system 120 can generate, identify, select or assign the dynamic identifier for a provider based on a time interval, event, condition, or other trigger. For example, the data processing system 120 can generate a new dynamic identifier for a provider on a daily basis, weekly basis, monthly basis, or other time interval. The data processing system 120 can generate, identify, select or assign the dynamic identifier upon identifying that a previous dynamic identifier was compromised. For example, the data processing system 120 may determine that a dynamic identifier of a provider (or client device) is being spammed or being used to conduct malicious or unwanted communications or attacks. The data processing system 120 can, in some cases, monitor the communications or source of communications to identify malicious or unwanted communications or sources, and automatically disengage the dynamic identifier. For example, the data processing system 120 can take the dynamic identifier out of use or assign a new dynamic identifier to a provider device or client device to replace the previously assigned dynamic identifier.

In some implementations, the data processing system 120 can provide the dynamic identifier for display with the content item on the webpage or provider search results page responsive to receiving an indication of interest in the content item. For example, the data processing system 120 can display the content item (e.g., advertisement or search result) on the webpage with a button, drop down menu, icon, roll-over icon, or other user interface widget. When a user interacts with the user interface widget (e.g., clicking or selecting a button), the data processing system 120 can receive an indication of the user selection.

Responsive to receiving the indication of user selection, the data processing system 120 can reveal, identify, select, generate or otherwise assign a dynamic identifier to the provider of the content item. The data processing system 120 may access a pool or repository of available dynamic identifiers, or generate a dynamic identifiers. The dynamic identifier may already be assigned to the content provider associated with the content item. The dynamic identifier may be assigned to a content campaign or a content group that includes the content item. The dynamic identifier may be a toll free "800" number, a charge number such as a "900" number, a local number, or a long distance number.

The data processing system may determine the dynamic identifier to be an available dynamic identifier if the dynamic identifier is not currently assigned to another content item or provider. For example, due to a limited number of virtual phone numbers and the costs associated with purchasing phone numbers, the data processing system 120 may be configured with one or more policies that facilitate reusing or recycling virtual numbers. The data processing system 120 may reuse a virtual number if the number has not been provided for display or otherwise used for a time interval or duration (e.g., 2 hours, 24 hours, 72 hours, a week, 30 days, 60 days, 90 days, etc.).

The data processing system 120 can map static identifiers to dynamic identifiers and store the mapping in an asynchronous communication data structure (e.g., static and dynamic identifier data structure 150) stored in data repository 140. The data structure 150 can map static identifiers to dynamic identifiers using one or more mapping techniques. In some implementations, the data processing system 120 can be configured with a one-to-one mapping of static identifiers to dynamic identifiers. In some implementations, the data processing system 120 can be configured with mapping static identifiers to dynamic identifiers using a hash technique or function. For example, the data structure 150 can include a hash table where an input dynamic or static identifier maps to a corresponding static or dynamic identifier.

In some implementations, the data processing system 120 can map static identifiers to dynamic identifiers such that there is a unique tuple, or ordered list. By using a unique tuple, the data processing system 120 can assign a single dynamic identifier to multiple client or provider devices. In some cases, a single client device or provider device may have multiple dynamic identifiers. In some implementations, the same dynamic identifier can be used to identify multiple client devices or provider devices.

The data processing system 120 can establish, assign, or identify a tuple for an asynchronous communication channel. For example, an asynchronous communication channel can be defined or identified by the tuple. The tuple may include, e.g., (client static identifier, client dynamic identifier, provider dynamic identifier, provider static identifier). The tuple may be an n-tuple, where "n" may be 2, 3, or 4. The following table illustrates static and dynamic identifiers assigned to client and provider devices.

TABLE 1

Static and Dynamic Identifiers for
Asynchronous Communication Channels

| Asynchronous Communication Channel # | Client Static Identifier | Client Dynamic Identifier | Provider Dynamic Identifier | Provider Static Identifier |
|---|---|---|---|---|
| 1 | A1 | B1 | C1 | D1 |
| 2 | A1 | B2 | C2 | D2 |
| 3 | A2 | B1 | C2 | D2 |
| 4 | A2 | B2 | C1 | D1 |

Table 1 illustrates static and dynamic identifiers for asynchronous communication channels. As illustrated in the table, a first client device can have a static identifier of A1 and a second client device can have a static identifier of A2. The first client device can have a dynamic identifier of B1 and B2, while the second client device may also have dynamic identifiers B1 and B2. Thus, the data processing system 120 can reuse the dynamic identifier. However, to establish the communication channel, the data processing system 120 can identify a unique tuple of the communication channel to identify a corresponding provider identifier. For example, the first asynchronous communication channel is between client static identifier A1 and provider static identifier D1. The data processing system 120 can receive a request to initiate the first communication channel. The request can include the client static identifier A1 identifying a client device. The request can further identify a provider dynamic identifier C1. The data processing system 120 can generate a tuple that includes the client static identifier A1 and provider dynamic identifier C1 as follows (A1, C1) or (C1, A1). The tuple (A1, C1) may map to provider static identifier D1 identifying a provider device. In another example, the request can identify the client static identifier A1 and client dynamic identifier B1 and provider dynamic identifier D1. Thus, the data processing system 120 can map the tuple (A1, B1, D1) to the provider static identifier C1.

When the provider receives the data package including the message over the first asynchronous communication channel 1, the provider may receive one or more of the client dynamic identifier B1 corresponding to the channel, the provider dynamic identifier B1 and the provider static identifier D1. The provider may then respond to the message or, at some later time, choose to send or transmit a message to a client device destined to client dynamic identifier B1. Since the static identifiers are hidden from the opposing endpoints of the communication channel or communication connection, the data processing system 120 can perform the tuple mapping technique to identify the corresponding client static identifier that is mapped to the client dynamic identifier B1. For example, the provider may send a request to send a message. The request can indicate the source address such as provider static identifier D1 and the provider dynamic identifier C1. The request may further indicate a destination address such as the client dynamic identifier B1. Thus, the data processing system 120 can generate a tuple (D1, C1, B1) and determine that this tuple maps to client static identifier A1. In another example, the data processing system 120 may generate tuple (D1, B1) and determine that this tuple maps to static identifier A1.

Using a tuple mapping technique may facilitate the data processing system 120 reusing dynamic identifiers. For example, client static identifier A2 can also have dynamic identifier B1. For example, a third communication channel 3 can include client static identifier A2, dynamic identifier B1, provider dynamic identifier C2 and provider static identifier D2. While the dynamic identifier B1 is being reused, the tuple is still unique because (A2, B1) can map to a unique static identifier D2. Thus, a request to initiate the third communication channel can include the static identifier 2 and provider dynamic identifier C2. The data processing system 120 can generate, from the identifiers in the request, the tuple (A2, C2) and map this tuple to static identifier D2. Similarly, when the provider device responds or messages the client device, the data processing system 120 can receive the provider static identifier D2 identifying the provider device and the dynamic identifier B1. The data processing system 120 can generate tuple (D2, B1) which can map to static identifier A2 identifying the client device of the second provider. In another example, the request can include the provider static identifier D2 and provider dynamic identifier C2 and client dynamic identifier B1. The data processing system 120 can generate tuple (D2, C2, B1) and determine this tuple maps to static identifier A2 identifying the second client device. Thus, the data processing system 120 can maintain a double blind asynchronous communication channel that reuses dynamic identifiers.

The data processing system 120 (e.g., via asynchronous communication agent 135) can generate a transmission data package that includes content, a source address identifying a source dynamic identifier and a destination address identifying a destination dynamic identifier. The transmission data package can also include a destination static address. For example, the transmission data package can include content "Please send me a quote to paint my fence by December 1." The content can be provided by client device. The data processing system 120 can receive the content from client device via network 105. The data processing system 120 can identify a dynamic identifier A1 of the client device. The data processing system 120 can further identify a dynamic identifier C1 of the provider device (e.g., the client device may provide an indication of the provider's dynamic identifier). The data processing system 120 can generate a tuple, for example, (A1, C1), and map the tuple to provider static identifier D1. The data processing system 120 can then generate a transmission data package with the client dynamic identifier, destination dynamic identifier, destination static identifier, and the content. The data processing system 120 may further generate the transmission data package in accordance with a provider side communication channel selected via the communication selection policy. The data processing system 120 may format the transmission data package based on the type of communication channel. For example, if the content includes rich text or HTML supported by the client-side communication channel, but the provider side communication channel supports only SMS text messaging, the data processing system 120 can strip the rich text and HTML code, identify the basic text, generate a transmission data package that only includes the basic text of the content. The data processing system 120 can then transmit the generated transmission data package over the communication channel.

After transmitting the content provided by the client device, the data processing system 120 can receive a second request from the provider device to asynchronously communicate with the client device. The request from the provider device can include the client dynamic identifier previously received by the provider device. For example, the provider device may store the received transmission data package in memory or in a data structure in memory. The stored transmission data package includes the content, client dynamic identifier, provider dynamic identifier and provider static address. In response to the first transmission data package, the provider device may generate the second request to include a destination address identifying the client dynamic identifier, a source address identifying the provider dynamic identifier, and the provider static address. The data processing system 120 can generate a tuple with some or all these identifier, and map the tuple to the client static identifier. The data processing system 120 can then generate a second transmission data package that includes the provider content (e.g., "$300 to paint one bedroom by December 1"), destination address identifying the client static identifier, client dynamic identifier, and source address identifying provider dynamic identifier. The data processing system 120 can then provide the generated second transmission data package for transmission via a client-side communication channel between the data processing system 120 and the client device.

In some implementations, the data processing system 120 can continuously monitor for new providers that are added to a provider data structure, and automatically initiate an asynchronous communication with the provider or provider a notification the client device of the new provider. The data processing system 120 can maintain a search query provided by a client device active for a period of time. The search query may indicate a time interval during which to maintain the search query active, or the data processing system 120 can automatically determine a time interval (e.g., data processing system 120 may determine to maintain a query to paint one bedroom by December 1 active until November 30). The data processing system 120 can monitor a provider data structure on a periodic basis (e.g., hourly, daily, twice a day, weekly, etc.). In some cases, the data processing system 120 can query the provider data structure responsive to identifying an update to the provider data structure.

In some implementations, the data processing system 120 can identify a category in the provider data structure, and monitor for new providers added to the category. For example, the provider data structure may include provider A, provider B, and provider C. However, the category for provider A and provider may be "paint", while the category for provider C may be handyman. Provider C may then change their category to "paint" (or the data processing system 120 may add category "paint" based on an indication that Provider C provides painting services). The data processing system 120 may then identify an addition to the "paint" category.

Responsive to the addition of Provider C to the "paint" category, the data processing, the data processing system 120 can provide a notification including Provider C's dynamic identifier to the client device of the addition. The notification can be provider over an asynchronous communication channel between the client device and data processing system 120. In some implementations, responsive to the addition of Provider C to the "paint" category, the data processing system 120 can retrieve the content of the request from the client device. The data processing system 120 can generate a transmission data package including the content, the source address identifying the client dynamic identifier and a destination address identifying the provider C's static identifier corresponding to the provider device of provider C. The data processing system 120 can provide the generated second transmission data package for transmission via a client-side communication channel between the data processing system and provider C's device.

In some implementations, the data processing system 120 can maintain the history of the conversation in a communication record 155 stored in data repository 140. The data processing system 120 can receive an indication to switch from a first communication channel to a second communication channel different from the first communication channel (e.g., switching a client-side communication channel from e-mail to SMS text messaging) during a conversation or asynchronous communication connection between a client device and provider device. For example, the client device 110 can generate an indication to switch, or may attempt to contact the provider dynamic identifier using a different medium. Responsive to detecting the switch, the data processing system 120 can access the communication record 155 for the communication corresponding to a tuple including one or more client/provider static or dynamic identifier. Thus, the asynchronous communication can be defined by or identified using a tuple including identifiers. The data processing system 120 can then port the history to a format for the new communication channel and transmit, over the new communication channel, the re-formatted historical data packages to the device requesting the switch.

Figure 2:
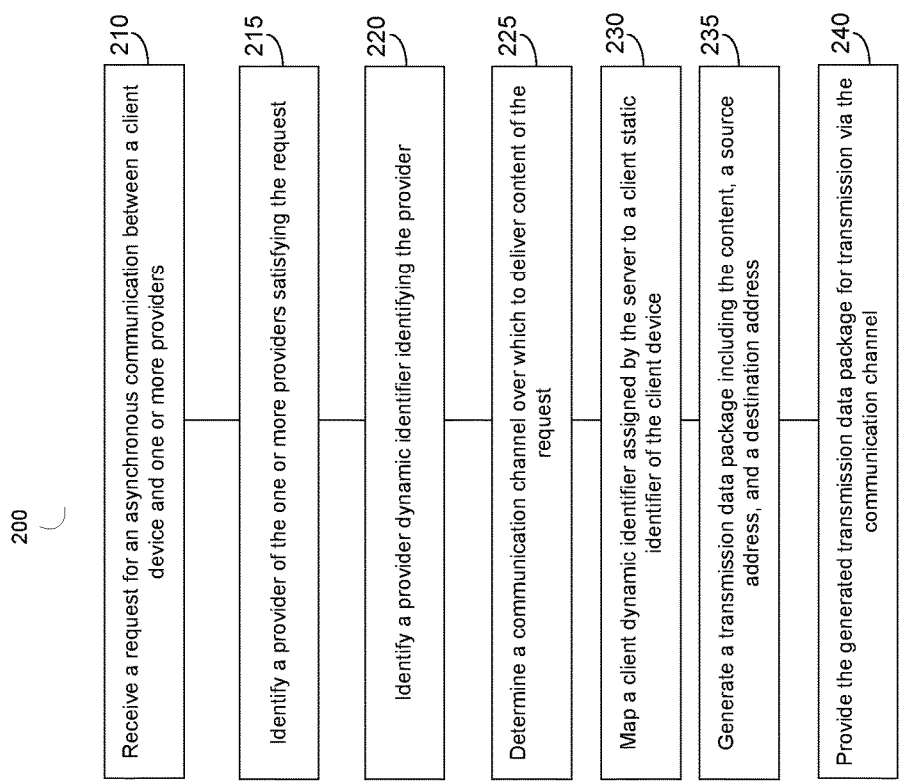
FIG. 2 is an illustration of a method of maintaining an asynchronous communication via an intermediary in accordance with an implementation.

FIG. 2 shows an illustration of a method of maintaining an asynchronous communication in accordance with an implementation. The method 200 can be performed via one or more system of component illustrated in FIG. 1, FIG. 3 or FIG. 4, including, e.g., a data processing system, provider search engine, asynchronous communication engine, or data repository. In brief overview, and in some implementations, the method 200 includes a data processing system receiving a request for an asynchronous communication between a client device and one or more providers at 210. At 215, the data processing system identifies a provider of the one or more providers satisfying the request. At 220, the data processing system identify a provider dynamic identifier identifying the provider. At 225, the data processing system determines a communication channel over which to deliver content of the request. At 230, the data processing system maps a client dynamic identifier assigned by the server to a client static identifier of the client device. At 235, the data processing system generates a transmission data package including the content, a source address, and a destination address. At 240, the data processing system provides the generated transmission data package for transmission via the communication channel.

Still referring to FIG. 2, and in further detail, the data processing system receives a request for an asynchronous communication between a client device and one or more providers at 210. For example, a provider search engine or an asynchronous communication agent of the data processing system can receive the request. The data processing system can receive the request from a client device. The request can include a client static identifier (e.g., a phone number of client device or username of a messaging application) identifying the client device. The request can also include content to deliver to the one or more providers, such as a request for a quote or estimate to complete a project, a request for a service, a request for goods, a request for lessons, etc. The data processing system can receive the request over a first communication channel, such as text messaging, SMS messaging, e-mail, an interface provided by data processing system, etc.

At 215, the data processing system identifies a provider of the one or more providers satisfying the request. The data processing system (e.g., via provider search engine or an asynchronous communication engine) can identify one or more providers. In some cases, the data processing system can provide a list of providers to the client device, and an operator of the client device can select the one or more providers for further communication.

At 220, the data processing system identify a provider dynamic identifier identifying the provider. The dynamic identifier can mask a provider's static identifier. The dynamic identifier can refer to a virtual phone number or other identifier generated by the data processing system. The data processing system can generate the dynamic identifier responsive to establishing the asynchronous communication channel between the provider device and the client device. The asynchronous communication channel can include a client-side communication channel and a provider-side communication channel. The data processing system can bridge, merge, combine, or otherwise interface between the client-side communication channel and provider-side communication channel to establish or maintain the asynchronous communication channel. The channel may be asynchronous because the message provided by the client may not be viewed by the provider in real-time. For example, in a phone call, the endpoints are communicating in real-time. However, in text messaging, the transmitted message may not be opened or viewed for a time period after the message is transmitted. Similarly, the recipient of the message may not respond for an additional time period.

In some implementations, the data processing system can identify the dynamic identifier responsive to receiving the selection of the provider from the client device. For example, the data processing system can display a list of providers via a search results webpage. The data processing system may not initially provide dynamic identifiers in that list. Responsive to an indication to initiate a communication with the provider received from the client device, the data processing system can access a repository storing dynamic identifier and select an available dynamic identifier. In some cases, in which the data processing system is configured with a tuple mapping technique, the data processing system can select a dynamic identifier that is also being used by other client or provider devices. In some implementations, the data processing system can select the dynamic identifier based on the type of communication channel or mode. For example, if the client-side communication channel is text messaging, the data processing system can select a dynamic identifier for the provider that corresponds to a text messaging destination address format.

At 225, the data processing system determines a communication channel over which to deliver content of the request. The data processing system can determine the communication channel over which to deliver content of the request to the provider using a communication channel selection policy. The data processing system can determine that the dynamic identifier of the provider maps to a provider static identifier. The data processing system can determine, based on the selection policy, that the static identifier corresponds to a phone number for an SMS text messaging channel; or an e-mail address for an e-mail communication channel.

In another example, the data processing system can use the selection policy to generate or identify the static or dynamic identifier. For example, the data processing system receive the request to initiate a communication with the provider, access a profile of the provider to determine a preferred communication channel, generate or identify a client dynamic identifier corresponding to the preferred channel for the provider, and provide the identified client dynamic identifier along with the transmission data package. In some cases, the provider can indicate a preference for one or more channels or modes with a priority. The data processing system can select the highest priority channel. The data processing system may select a second priority channel if the data processing system determines that the higher priority channel is unavailable. For example, a phone number for SMS messaging may correspond to the highest priority. However, the data processing system may ping or test the phone number and determine that the phone number has been disconnected. The data processing system can, responsive to determining that the phone number has been disconnected, revert to a second priority channel, such as e-mail, and select a corresponding identifier.

Thus, the data processing system can generate, identify or assign a client dynamic identifier corresponding to a communication channel mode preferred by the provider. At 230, the data processing system maps a client dynamic identifier assigned by the server to a client static identifier of the client device. The data processing system can map identifiers based on a one-to-one mapping technique. The data processing system can map identifiers based on a tuple mapping technique as illustrated in Table 1.

At 235, the data processing system generates a transmission data package including the content, a source address identifying the client dynamic identifier, and a destination address identifying the provider static identifier. In some implementations, the package can also include a provider dynamic identifier. The data processing system can format the content provided by the client device for transmission over the provider-side communication channel. The data processing system can include the client dynamic identifier selected based on the format of the provider-side channel.

In some implementations, the data processing system 120 can generate an outer header that identifies the client dynamic identifier as the source address and the provider static identifier as the destination address. The data processing system 120 can then encapsulate the data package with the generated outer header to generate the transmission data package. An agent or resource (e.g., provider communication resource 160 or client communication resource 165) can receive the encapsulated transmission package, process or parse the data package, de-encapsulate the outer header, and process the data.

In some implementations, the transmission data package can include header information and payload information. The header can identifier a source address and destination address, while the payload can include the data of the content. In some implementations, the data processing system can filter out from the header information transmitted to the provider device any information that could allow the provider to uniquely identify the client device. For example, the header information provided to the provider may only include the client dynamic identifier, and not include the client static identifier. The header may include one or both of the provider static identifier and provider dynamic identifier because data package is being transmitted to the provider. Similarly, if the transmission data package is from the provider and sent to the client, the data processing system can filter out, remove or otherwise not provide the provider static identifier.

At 240, the data processing system provides the generated transmission data package for transmission via the communication channel. The data processing system can provide the generated transmission data package for transmission via the communication channel determined using the communication channel selection policy to the provider device. The data processing system can provide the generated transmission data package responsive to the request from the client device. In some implementations, the data processing system can send the package based on a delay preset by the client device. In some implementations, the data processing system can generate and transmit multiple transmission data packages to multiple provider devices.

FIG. 3 is a block diagram of a system for maintaining an asynchronous communication via an intermediary in accordance with an implementation. The system 300 includes the data processing system 120 intermediary to a plurality of client devices 110*a-n* and a plurality of provider devices 305*a-c*. The client device 110*a*, for example, can include or be associated with a client static identifier 310. The client device 110*a* can also store multiple provider dynamic identifiers 315*a*, 315*b*, and 315*c*. The client device 110*a* can store, obtain, receive or other identify the provider dynamic identifier because the client device 110*a* can use the provider dynamic identifier to communicate with the provider. For example, the client device 110 can use provider dynamic identifier 315*a* to send a communication data package to provider device 305*a*; the client device 110 can use provider dynamic identifier 315*b* to send a communication data package to provider device 305*b*; and the client device 110 can use provider dynamic identifier 315*c* to send a communication data package to provider device 305*c*. The provider dynamic identifier can be assigned based on the client-side communication channel (or type or mode) because the provider dynamic identifier can be used by the client device to send a transmission data package over the client-side communication channel.

The data processing system 120 can maintain multiple client-side communication channels 330*a*, 330*b*, and 330*c*. The data processing system 120 can maintain multiple provider-side communication channels 335*a*, 335*b*, and 335*c*. The data processing system can generate a first asynchronous communication channel 340*a* that includes a first client-side communication channel 330*a* and a first provider-side communication channel 335*a*. The data processing system can generate a second asynchronous communication channel 340*b* that includes a second client-side communication channel 330*b* and a second provider-side communication channel 335*b*. The data processing system can generate a third asynchronous communication channel 340*c* that includes a third client-side communication channel 330*c* and a third provider-side communication channel 335*c*. The client-side communication channels 330*a-c* and provide-side communication channels may be the same type of channels or different types of channels (e.g., utilize different communication modes).

Each provider device 305*a-c* can include a corresponding provider static identifier 320*a-c*. Each static identifier may be unique to the provider or unique to the type of communication channel. For example, a username of "Provider A" can be unique to a first type of text messaging application, while the username of "Provider A" may also exist on a different type of text messaging application that does not interface with the first text messaging application.

Each provider device 305a-c can include, obtain, store, receive or otherwise identify one or more client dynamic identifiers 325a-c. While the figure illustrates a single client dynamic identifier for each provider device, the data processing system can provide additional dynamic identifiers for the provider device. For example, a first provider device 305a can communicate with client device 110b and client device 110a, in which case the data processing system may provide a second client dynamic identifier to the first provider device 305a. The provider device 305a can store the client dynamic identifier 325a to allow the provider device 305a to use the client dynamic identifier 325a to transmit a data communication package to the client device 110a.

When sending the transmission data package, the client device 110 can include the message content, a source address identifying a client static identifier 310, and a destination address identifying a provider dynamic identifier 315a. The data processing system 120 receives the transmission data package, generates a tuple including the client static identifier 310 and provider dynamic identifier 315a, and maps the tuple to the provider static identifier 320a. The data processing system may further identify a type of provider-side communication channel and format the content of the message for the communication channel. The data processing system can then generate a second transmission data package to send to the provider device. This second transmission data package can include a source address identifying a dynamic address of the client device 325a, a destination address identifying the provider static identifier 320a, and the content of the message in a suitable format. The provider device 305a, responsive to receiving the second transmission data package, can store the client dynamic identifier 325a in memory for further communication.

Figure 4:
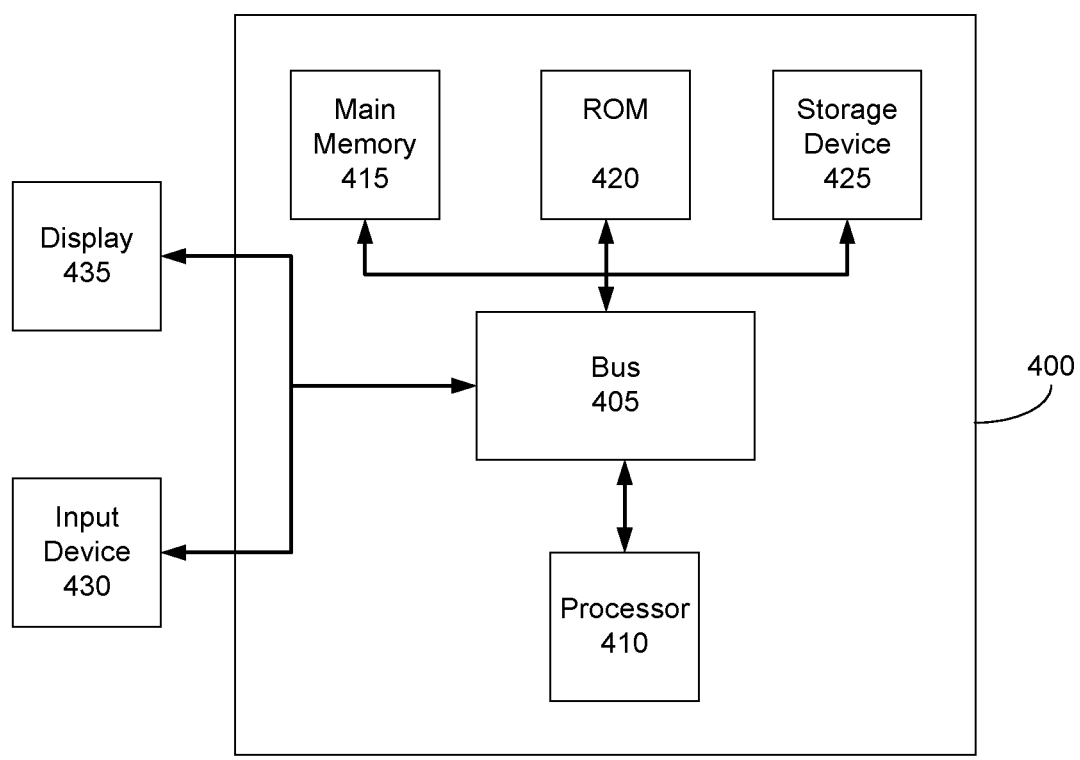
FIG. 4 is a block diagram illustrating a general architecture for a computer system that may be employed to implement various elements of the system shown in FIGS. 1 and 3, and the method shown in FIG. 2, among others, in accordance with an implementation.

FIG. 4 is a block diagram of a computer system 400 in accordance with an illustrative implementation. The computer system or computing device 400 can be used to implement the system 100, system 300, provider 125, computing device 110, content publisher 115, data processing system 120, provider search engine 130, asynchronous communication agent 135, and data repository 140. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
a data processing system comprising one or more processors and memory, the data processing system intermediary to a plurality of first devices and a plurality of second devices;
a communication agent executed by the data processing system to:
receive, from a first device of the plurality of first devices, responsive to an action performed by a user of the first device to initiate a telephone call or a message to a second device, a request to establish a communication session between the first device and the second device of the plurality of second devices, the request identifying the first device, the second device selected by the data processing system to satisfy the request;
assign, responsive to receiving the request to establish the communication session, a first dynamic identifier to the first device and a second dynamic identifier to the second device;
establish, using the first dynamic identifier and the second dynamic identifier, the communication session between the first device and the second device via the communication agent, the communication session configured to transmit one or more communication packets corresponding to at least one of the telephone call or the message between the first device and the second device;

and transmit, via the established communication session, the one or more communication packets between the first device and the second device using the first dynamic identifier and the second dynamic identifier.

2. The system of claim 1, wherein the data processing system is further configured to store, in one or more data structures, an association between the first dynamic identifier of the first device, the second dynamic identifier of the second device, and a session identifier identifying the communication session.

3. The system of claim 1, wherein the data processing system is further configured to store, in one or more data structures, an association between the first dynamic identifier of the first device, a first static identifier of the first device, the second dynamic identifier of the second device, a second static identifier of the second device, and a session identifier identifying the communication session.

4. The system of claim 3, wherein the first static identifier corresponds to a first phone number of the first device and the second static identifier corresponds to a second phone number of the second device.

5. The system of claim 3, wherein the first static identifier is associated with a first application executing on the first device and the second static identifier is associated with a second application executing on the second device, and wherein the communication session is established between the first application executing on the first device and the second application executing on the second device.

6. The system of claim 1, wherein the data processing system is further configured to terminate the communication session responsive to a predetermined time.

7. The system of claim 1, wherein the user is a first user, the request is a first request, and the communication session is a first communication session, and wherein the data processing system is further configured to:
receive, from a third device of the plurality of first devices, responsive to an action performed by a second user of the third device, a second request to establish a second communication session between the third device and the second device, the second request identifying the third device;
assign, responsive to receiving the second request to establish the second communication session, a third dynamic identifier to the third device and a fourth dynamic identifier to the second device; and
establish, using the third dynamic identifier and the fourth dynamic identifier, the second communication session between the third device and the second device via the communication agent.

8. The system of claim 1, wherein the data processing system is further configured to assign a third dynamic identifier to the first device and a fourth dynamic identifier to the second device responsive to a predetermined time.

9. The system of claim 1, wherein the request to establish the communication session identifies a communication mode, wherein the data processing system is further configured to establish the communication session between the first device and the second device based on the communication mode.

10. The system of claim 1, wherein the one or more communication packets comprises a first communication packet from the first device to the second device, wherein the data processing system is further configured to:
receive, from the second device, a second communication packet for transmission to the first device, and
transmit, via the communication session, the second communication packet from the second device to the first device.

11. A method, comprising:
receiving, by a data processing system, from a first device of the plurality of first devices, responsive to an action performed by a user of the first device to initiate a telephone call or a message to a second device, a request to establish a communication session between the first device and the second device of the plurality of second devices, the request identifying the first device, the second device selected by the data processing system to satisfy the request;
assigning, by the data processing system, responsive to receiving the request to establish the communication session, a first dynamic identifier to the first device and a second dynamic identifier to the second device;
establishing, by the data processing system, using the first dynamic identifier and the second dynamic identifier, the communication session between the first device and the second device via the communication agent, the communication session configured to transmit one or more communication packets corresponding to at least one of the telephone call or the message between the first device and the second device;
and transmitting, by the data processing system, via the established communication session, the one or more communication packets between the first device and the second device using the first dynamic identifier and the second dynamic identifier.

12. The method of claim 11, further comprising storing, by the data processing system, in one or more data structures, an association between the first dynamic identifier of the first device, the second dynamic identifier of the second device, and a session identifier identifying the communication session.

13. The method of claim 11, further comprising storing, by the data processing system, in one or more data structures, an association between the first dynamic identifier of the first device, a first static identifier of the first device, the second dynamic identifier of the second device, a second static identifier of the second device, and a session identifier identifying the communication session.

14. The method of claim 13, wherein the first static identifier corresponds to a first phone number of the first device and the second static identifier corresponds to a second phone number of the second device.

15. The method of claim 13, wherein the first static identifier is associated with a first application executing on the first device and the second static identifier is associated with a second application executing on the second device, and wherein the communication session is established between the first application executing on the first device and the second application executing on the second device.

16. The method of claim 11, further comprising terminating, by the data processing system, the communication session responsive to a predetermined time.

17. The method of claim 11, wherein the user is a first user, the request is a first request, and the communication session is a first communication session, and wherein the method further comprises:
receiving, by the data processing system, from a third device of the plurality of first devices, responsive to an action performed by a second user of the third device, a second request to establish a second communication session between the third device and the second device, the second request identifying the third device;

assigning, by the data processing system, responsive to receiving the second request to establish the second communication session, a third dynamic identifier to the third device and a fourth dynamic identifier to the second device; and establishing, by the data processing system, using the third dynamic identifier and the fourth dynamic identifier, the second communication session between the third device and the second device via the communication agent.

18. The method of claim 11, further comprising assigning, by the data processing system, a third dynamic identifier to the first device and a fourth dynamic identifier to the second device responsive to a predetermined time.

19. The method of claim 11, wherein the request to establish the communication session identifies a communication mode, and the method further comprises establishing, by the data processing system, the communication session between the first device and the second device based on the communication mode.

20. The method of claim 11, wherein the one or more communication packets comprises a first communication packet from the first device to the second device, and the method further comprises:

receiving, by the data processing system, from the second device, a second communication packet for transmission to the first device, and transmitting, by the data processing system, via the communication session, the second communication packet from the second device to the first device.

\* \* \* \* \*